US012576564B2

(12) United States Patent　　　　　(10) Patent No.:　　US 12,576,564 B2
Krabel　　　　　　　　　　　　　　　　(45) Date of Patent:　　Mar. 17, 2026

(54) METHOD FOR PRODUCING A FOAM-BACKED MOULDED COMPONENT, AND MOULDED COMPONENT

(71) Applicant: Matthias Krabel, Markt Taschendorf (DE)

(72) Inventor: Matthias Krabel, Markt Taschendorf (DE)

(73) Assignee: Matthias Krabel, Markt Taschendorf (DE)

( * ) Notice: Subject to any disclaimer, the term of this patent is extended or adjusted under 35 U.S.C. 154(b) by 228 days.

(21) Appl. No.: 18/274,164

(22) PCT Filed: Jan. 17, 2022

(86) PCT No.: PCT/EP2022/050869

§ 371 (c)(1),
(2) Date: Aug. 25, 2023

(87) PCT Pub. No.: WO2022/161804

PCT Pub. Date: Aug. 4, 2022

(65) Prior Publication Data

US 2025/0001656 A1　　　Jan. 2, 2025

(30) Foreign Application Priority Data

Jan. 28, 2021　(DE) ..................... 10 2021 101 960.5

(51) Int. Cl.
　B29C 44/14　　(2006.01)
　B29C 44/34　　(2006.01)
　　(Continued)

(52) U.S. Cl.
　CPC .......... B29C 44/14 (2013.01); B29C 44/3492 (2013.01); B29C 44/581 (2013.01);
　　(Continued)

(58) Field of Classification Search
　CPC ..... B29C 44/14; B29C 44/3492; B29C 44/48; B29C 44/581; B29C 33/424;
　　(Continued)

(56) References Cited

U.S. PATENT DOCUMENTS 3,405,506 A　　10/1968　Kostur
4,559,094 A　*　12/1985　Hostetler ................ B29C 44/56
　　　　　　　　　　　　　　　　　264/129
　　(Continued)

FOREIGN PATENT DOCUMENTS

DE　　　3934652 A1　　4/1991
DE　　　4017173 A1　　12/1991
　　(Continued)

*Primary Examiner* — Hai Vo
(74) *Attorney, Agent, or Firm* — Dickinson Wright PLLC; Andrew D. Dorisio; Nicholas P. Coleman

(57)　　　　ABSTRACT

The invention relates to a method for producing a foam-backed molded component, the method comprising the following steps: a) introducing a cover material in a mold (100), the mold (100) having a negative-profiled surface (310); and b) generating and maintaining a vacuum and/or negative pressure on the side of the cover material facing the mold (100); and c) pouring a foam material in the mold (100); and d) closing the mold (100); and e) molding the foam material; and f) opening the mold (100) and removing a foam-backed molded component, the foam-backed molded component having a profiled surface.

11 Claims, 2 Drawing Sheets

(51) Int. Cl.

| | |
|---|---|
| *B29C 44/58* | (2006.01) |
| *B29K 75/00* | (2006.01) |
| *B29L 31/00* | (2006.01) |
| *B32B 3/30* | (2006.01) |
| *B32B 5/18* | (2006.01) |

(52) U.S. Cl.
 CPC ................... *B32B 3/30* (2013.01); *B32B 5/18* (2013.01); *B29K 2075/00* (2013.01); *B29L 2031/768* (2013.01); *B29L 2031/771* (2013.01); *B32B 2266/0278* (2013.01); *B32B 2571/00* (2013.01); *B32B 2601/00* (2013.01)

(58) Field of Classification Search
 CPC ........... B29K 2075/00; B29L 2031/768; B29L 2031/771; B32B 2266/0278; B32B 2571/00; B32B 2601/00; B32B 3/30; B32B 5/18
 See application file for complete search history.

(56) References Cited

U.S. PATENT DOCUMENTS

| | | | |
|---|---|---|---|
| 5,382,398 A | 1/1995 | Draxlmaier, Jr. | |
| 6,120,630 A | 9/2000 | Lorbiecki | |
| 2009/0255625 A1 | 10/2009 | Fox et al. | |
| 2016/0096462 A1 | 4/2016 | Kromm et al. | |
| 2020/0140979 A1* | 5/2020 | Valls Anglés | C22C 38/44 |

FOREIGN PATENT DOCUMENTS

| | | | |
|---|---|---|---|
| DE | 4310803 A1 | 10/1994 | |
| DE | 19546397 A1 | 6/1997 | |
| DE | 102006004816 B4 | 4/2010 | |
| DE | 102011112164 A1 | 2/2013 | |
| DE | 102015219162 A1 | 4/2016 | |
| EP | 0149303 A2 | 7/1985 | |
| EP | 0428858 A1 | 5/1991 | |
| JP | S58199128 A | 11/1983 | |
| WO | 1994022665 A1 | 10/1994 | |
| WO | 2013030219 A1 | 3/2013 | |

* cited by examiner

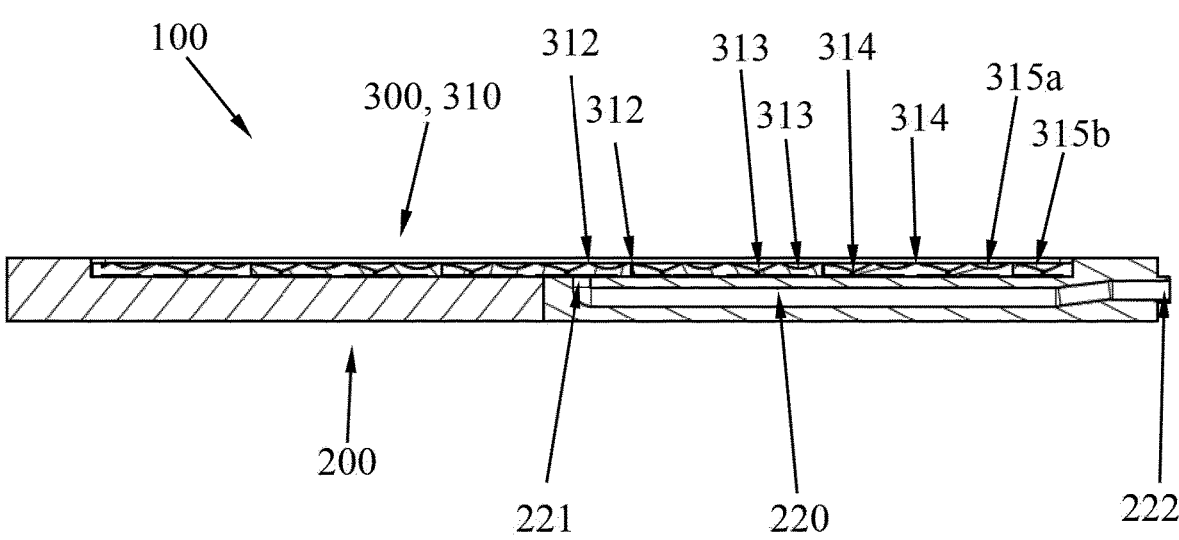
Fig. 3
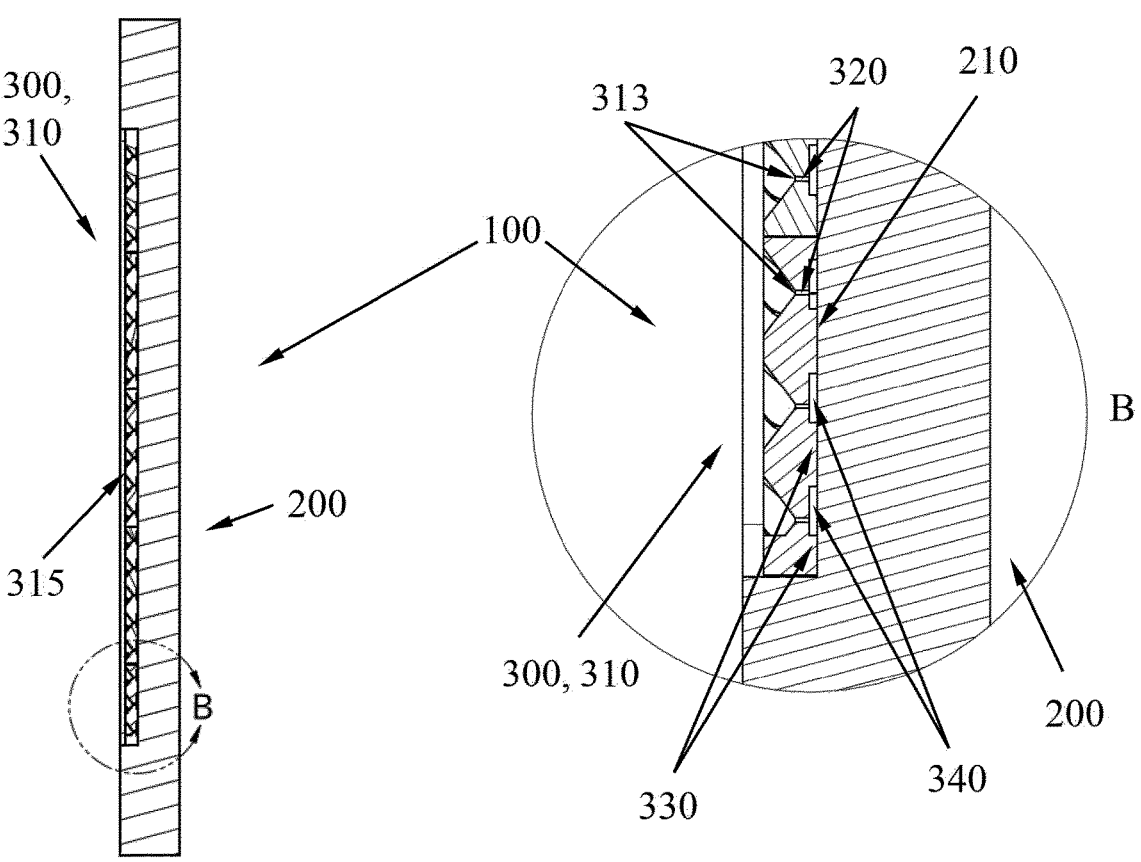
Fig. 4                                      Fig. 5

METHOD FOR PRODUCING A FOAM-BACKED MOULDED COMPONENT, AND MOULDED COMPONENT

TECHNICAL FIELD

The invention relates to a method for producing a foam-backed molded component.

BACKGROUND

In the state of the art, foam-backed molded components find manifold uses through the combination of suppleness with a smooth and firm surface. In particular, the molded components are used for the interior covering of vehicles and spaces. Another field is the production of seats. In this context, it is particularly preferable when the foam-backed surface has a profile for molding a foam-backed profiled surface. This profiled surface can fulfil several functions, e.g., the representation of logos, the absorption of sound and/or the support of an ergonomic posture.

In the current state of the art, methods for producing foam-backed molded components are known. For this purpose, a profiled surface is introduced in the foam-backed surface, in different manners. These methods, however, have various disadvantages.

An exemplary method for producing a foam-backed molded component having a uniform surface, which retrospectively receives a desired profile surface via sewing, is disclosed in publication DE 40 17 173 A1. A disadvantage of this method is that the large work expenditure, on the one hand, and the limitations on bent surfaces which extend between the seams, on the other hand. In addition, the act of sewing means a significant increase in the work expenditure during production. Depending on the field of use required, an additional sealing of the seams may be required.

In another exemplary method according to publication DE 10 2015 219 162 A1, a profiled surface is imprinted onto a flat molded component via pressure on and heating of the material. In this method as well, at least two method steps are required. A further disadvantage of this method is its suitability exclusively for flat molded components, which heavily limits the field of application.

A third exemplary embodiment according to publication DE 43 10 803 A1 intends preforming the cover material by means of a negative pressure. Subsequently, the preformed cover material is foam-backed by introducing foam material via nozzles. A disadvantage of this feature is that the foam material is compacted in the area of the nozzles and is less dense in the area further away from the nozzles, as the following foam material further conveys and thus distributes the previously introduced foam material in the mold via pressure. Owing to this, compressions occur in close proximity to the injection nozzles. Before and/or at the beginning of the foaming process, the foam material already has more compact and less compact areas which ultimately remain in the foam body of the foam-backed mold component. This difference in the density of the foam material is transferred to the produced foam-backing, meaning ultimately more dense and less dense areas arise in the foam body of the foam-backing. This allows a persisting tension to be produced in the foam, which ultimately leads to the disforming of the molded component over time. In addition, the molded component softens unevenly, which leads to uncomfortable pressure sensations for the user in particular in the use of seats.

The molds, which are used in the state of the art, are made of materials such as metal, alloys, e.g., steel, or mixtures thereof, as these materials are resistant to external and internal force effects or corrosion, such as friction, pressure, impact and/or blow, owing to environmental influences, such as high and/or low ambient temperatures, temperature fluctuations, temperature differences, UV radiation and/or gases.

Therefore, there is a great demand for a simply, quickly and inexpensively executable method for producing foam-backed molded components which reliably and continuously have a complex, uniform and arbitrarily molded profiled surface. Furthermore, the foam-backed molded components should be inexpensively producible, be able to be designed individually and according to requirements and be adaptable as well as durable, long-lasting and equally supple while not being able to be deformed or disformed, in particular even under long durations of pressure exertions. The object of the invention is therefore to provide a method for producing a foam-backed molded components and foam-backed molded components in order to overcome the difficulties mentioned above.

SUMMARY

This object is attained in a surprisingly simple yet effective manner by a method for producing foam-backed molded components and by a foam-backed molded component according to the teachings of the independent claims.

According to the invention, a method for producing a foam-backed molded component is proposed, which comprises the following steps:

a) introducing a cover material in a mold, the mold having a negative-profiled surface; and b) generating and maintaining a vacuum and/or negative pressure on the side of the cover material facing the mold; and c) pouring a foam material in the mold; and d) closing the mold; and e) molding the foam material; and f) opening the mold and removing a foam-backed molded component, the foam-backed molded component having a profiled surface.

The fundamental idea of the invention rests on giving the foam-backing of the foam-backed molded component a design which is as uniform as possible, in particular in the area of the profiled surface. In this context, it has been deemed essential to the invention that the size and the prevalence of the foam bubbles are to essentially be uniform over the entire foam-backing and thus in all areas. In the scope of the invention, it has been acknowledged that the resulting uniform density leads to slight tension differences in the material. These tension differences ultimately cause the disforming of the material. In addition, it has been acknowledged that the longevity of the foam-backed profiled surface is significantly improved by a preforming of the cover material.

In first step a), a cover material is introduced in a mold. In this context, the mold can be made in one part or multiple parts. The mold comprises a negative-profiled surface designed according to a negative profile. The negative profile corresponds to the profile which is meant to have the profiled surface of the foam-backed molded component, the protrusions being inverted. The design of the profile is arbitrary in this case. It is conceivable for the shape of the profile to be adapted to practical and/or aesthetical demands. Practical demands can originate from demands of ergonomics, safety and/or comfort, while aesthetic demands are founded in the representation of a pleasing appearance and/or the representation of a logo, for example. When introducing the cover material, it must be ensured that the cover material has no creases, as these would otherwise remain in the profiled surface. Generally, it is arbitrary of which material the cover material is made, as long as it is suitable for the method. Suitable materials are known to the person skilled in the art.

The term "profile" refers to a height difference attained via at least one indentation and/or at least one protrusion, wherein the height difference is designed as a continuous and contiguous surface. For this purpose, the surface can be produced by combining two or more surfaces at at least one border of these surfaces, thus forming an edge, a step and/or a curve. An edge is an unsteady change of direction of the surface normal, the edge being straight or curved. The term "step" refers to a straight or curved structure in the profiled surface, for which two surfaces are disposed at an offset to each other to overcome a height difference, at least one border of the first surface extending along at least one border of the second surface, the tangential vectors of the surface essentially being parallel in the direction of the respective other surface along the border, and the two surfaces being connected by a third surface protruding orthogonally to the essentially parallel tangential vectors, thus forming two edges. In particular, the tangential vectors are viewed as essentially parallel when including intersecting angles of less than 10°, less than 9°, less than 8°, less than 7°, less than 6°, less than 5°, less than 4°, less than 3°, less than 2° or less than 1°. In particular, a tangential vector is viewed as essentially orthogonal to the third surface when it includes a cutting angle of more than 80°, more than 81°, more than 82°, more than 83°, more than 84°, more than 85°, more than 86°, more than 87°, more than 88° or more than 89° to the third surface. The person skilled in the art is familiar with indicating the smallest vector for indicating the intersecting angle between two vectors or a vector having a plane, if available. The term "step height" refers to the distance of the two essentially parallel surfaces in the area of the at least first and the at least second edge. In this context, it is conceivable for the step height to be dependent on location.

In the scope of the invention, it is conceivable for the height difference to be overcome by one or more breaks, in the form of one or several edges and/or steps, and/or being flowing, in the form of a curve. It is thus conceivable for the profile to be designed differently or be repetitive of itself. The term "profiled surface" refers to a surface of a body whose design is imprinted by a profile.

In subsequent step b), a vacuum and/or a negative pressure is generated and maintained on the side of the cover material facing the mold. The vacuum and/or the negative pressure cause a force which pulls the cover material into the negative profile. This force deforms the cover material and imprints the desired profile thereon. Simultaneously, the vacuum and/or negative pressure prevent the cover material from shifting, meaning the pre-deforming is effectively maintained during the process. It has been deemed as essential to the invention that the cover material is pre-deformed, as it would otherwise be constantly subjected to constant stress and would favor a disforming over time. Preferably, the negative-profiled surface has one or more openings at at least one, preferably at several, indentations of the profile, the vacuum and/or the negative pressure being transferred to the cover material by means of the openings. Particularly preferably, the negative-profiled surface has one or several openings on each indentation, the vacuum and/or the negative pressure being transferred to the cover material by means of the openings. By placing the opening at an indentation of the profile, the cover material is entirely adapted to the negative-profiled surface.

The term "vacuum" refers to a space, in which no matter, in particular no gas and in particular no air, is present.

The term "negative pressure" refers to a gas pressure in a space, which is relatively lower than an ambient gas pressure which a gas outside of the space has. As a rule, the gas outside of the space is air and the ambient gas pressure is the atmosphere gas pressure. The atmosphere gas pressure depends on location: at sea level it is approximately 1 bar.

In subsequent step c), the foam material is poured in the mold. In the scope of the invention, it has been deemed essential that pouring in contrast to injection-molding as in the state of the art attains and ensures an uniform distribution of the foam material before the foaming process, or rather at the beginning of the foaming process. When pouring, the foam material is distributed via mechanical movement, meaning a uniform density is additionally attained and ensured before, or rather at the beginning of the foaming process. The person skilled in the art is familiar with the foaming process beginning as soon as the foam material exits the nozzle and/or the pouring device. Generally, it is arbitrary which foam material is used, as long as it is suitable for the method. The person skilled in the art is aware of suitable materials, such as a polyurethane foam.

In subsequent step d), the mold is closed. Closing the mold serves to give the molded component the desired shape on the rear and to limit the foam-backing in its extent. At the same time, pressure is accumulated in the mold by the closure and by the foaming process, the pressure contributing to a uniform density of the foam-backing, in particular in the foam-backing in the area of the profile surface. The person skilled in the art knows of suitable measures for closing the mold. Preferably, the mold is closed using a lid.

In a subsequent step e), the foam material is molded. The person skilled in the art is familiar with the foam arising via chemical reaction by selecting the proper foam material. In this context, the duration of the chemical reaction is referred to as rise time. The rise time is measured either by a corresponding apparatus, which is time-controlled and/or sensor-controlled, the sensor registering the temperature in the mold and/or on the outer side of the mold, the pressure in the mold, the concentration, the prevalence and/or ratio of chemical reaction residue and/or main products and/or byproducts. Alternatively, the estimate of the rise time is based on experience.

In the scope of the invention, it has been acknowledged that the interaction of the vacuum and/or the negative pressure on the one hand and the pressure arising via the foaming process on the other hand leads to a pronounced pre-deforming of the profiled surface. In this context, it has been deemed essential to the invention that the vacuum and/or the negative pressure is maintained during the entire foaming process. In this manner, a material-bonded connection is yielded between the profiled surface and the foam-backing, meaning no tension differences occur in the molded component after completion of the foaming process in interaction with the uniform density of the foam-backing. Consequently, a disforming is effectively prevented.

In particular, no tension occurs between the cover material and the foam-backing. As no tension occurs within the foam-backing, in particular in the area of the profiled surface, its shape is maintained even in the area of the profiled surface and no disforming occurs.

In final step f), the mold is opened and the foam-backed molded component is removed. This comprises the foam-backed profiled surface produced in the method. The profiled surface has been yielded because the mold has a negative-profiled surface: the cover material has been suctioned by means of the vacuum and/or the negative pressure and has been preformed via the pressure arising during the foaming process. In addition, the foam-backing having a uniform density receives the profile. The material bond between the foam-backing and the cover material moreover prevents the separation of the cover material from the foam-backing. By pre-deforming the cover material by means of the vacuum and/or the negative pressure together with pouring the foam material, it is possible to produce a foam body having the advantages described in detail elsewhere, the foam body not having any inner tension owing to its essentially uniform density which is caused by the essentially uniform size and prevalence of the foam bubbles.

The term "essentially" means only a slight, in particular insignificant, change, modification and/or deviation from the corresponding conditions occurs.

It is obvious to the person skilled in the art that the removal of the molded component is noticeably simplified when the vacuum and/or the negative pressure are reduced after completion of the foaming process and before the removal. It is insignificant for the method whether the vacuum and/or the negative pressure are reduced before, during or after the mold is opened. Equally, it is of no importance whether the vacuum and/or the negative pressure is reduced before, during or after the removal of the foam-backed molded component: preferably, however, the vacuum and/or negative pressure is reduced before the removal, as the removal of the foam-backed molded component, as previously explained, is thus significantly simplified.

By means of the method according to the invention, it is thus possible to reliably produce a durable and inherently stable foam-backed molded component with a reduced number of production steps, the molded component having an individual and adjustable as well as durable and permanent profiled surface as required. The method is cost-efficient, quickly and easily executable in particular owing to the reduction of the method steps. The molded components are uniformly supple and resistant against continuous deformation because of temporary or continuing pressure.

Advantageous embodiments of the invention, which are realizable individually or in combination with each other, are represented in the dependent claims.

In another embodiment, it is conceivable for the mold to be partially or entirely made of a heat-resistant plastic, a metal, an alloy and/or a mixture thereof. Particularly preferably, the mold is partially or entirely made of a heat-resistant plastic. In the state of the art, it is common to produce molds of metal, such as aluminum or iron, alloys, such as steel, and/or mixtures thereof, as they have advantages, which are mentioned elsewhere. In the scope of the invention, however, it has been acknowledged that these materials have a thermal conductivity. For instance, the thermal conductivity of steel is 80.2 W/(m*K) and the thermal conductivity of the different aluminum alloys ranges from 75 W/(m*K) to 235 W/(m*K). Moreover, it has been acknowledged that heat arises during the foaming process, which causes the entire and/or uniform reaction of the foaming process. This heat, however, is dissipated from the materials of which the mold is made, owing to their thermal conductivity and the temperature balance setting in is too low for the reaction to take place reliably, uniformly and/or entirely. In the state of the art, it is thus known to additionally heat the mold artificially. Moreover, it is known that plastics have less thermal conductivity than the previously mentioned materials. If the mold is now partially or entirely made of a plastic of this kind, a higher temperature arises in the mold, as the heat occurring during the foaming process is dissipated at a lesser degree and a greater temperature balance thus sets in. In this manner, the additional supply of heat from outside becomes necessary to a lesser extent or can even be omitted entirely. Preferably, the plastic has a thermal conductivity of less than 10 W/(m*K). Even more preferably, the plastic has a thermal conductivity of less than 5 W/(m*K). In this context, it has been acknowledged that the used plastic has to be heat-resistant with respect to the arising reaction temperature. The person skilled in the art is aware of suitable plastics.

Further, it is conceivable for the mold to comprise at least one first module and at least one second module, the at least one first module being made partially or entirely of a first material and the at least one second module being made partially or entirely of a second material, the first and the second material being the same or different. In this context, the first module is preferably a base body which provides the required stability to the mold and determines the outer dimensions and the frontal outer mold design of the foam-backed molded component. It is conceivable that a mold has two, three, four, five, six, seven, eight, nine, ten or more differently designed first modules. Preferably, the first module has a suitably designed structure for being connected to the second and/or other module. However, it is also conceivable for the second module to additionally or alternatively have a suitable structure for being connected to the first module. The second module preferably comprises a negative-profiled surface. With the aid of the second module, the profiled surface of the foam-backed molded component is designed. A mold having two, three, four, five, six, seven, eight, nine, ten or more differently designed second modules is conceivable. In the scope of the invention, it has been acknowledged that it can be desired for a foam-backed molded component to have the same outer dimensions and the same frontal outer mold design as a different foam-backed molded component, though it should differ from the same with respect to the design of the profile. In such an event, it is desirable that the negative profile surface is modifiable. If the mold comprises at least one first second module, which has a first negative-profiled surface, and a second module, which has a second negative-profiled surface different to the first negative-profiled surface, it thus becomes possible to integrate the first second or the second module in the form, if required, to thus modify the negative-profiled surface and to produce foam-backed molded components having a profiled surface in the one design and in the other design using the same mold. In this context, it is also conceivable to integrate the second module in the first second module in order to merely adapt a limited area. This adaption can, for example, include introducing a charge number and/or a trademark symbol: other uses are also conceivable. In addition, it can be desirable for a foam-backed molded component to have a profiled surface having the same profile as a different foam-backed molded component, while differing from the other foam-backed molded component in its outer dimensions and/or its frontal outer mold design.

In such a case, it is desirable that the base body is modifiable. If the mold has at least one first module, which determines first outer dimensions and a first frontal outer mold design, and a second first module, which determines second dimensions different to the first outer dimensions and/or a second frontal outer mold design different to the first frontal outer mold design, it thus becomes possible to integrate the first module or the second first module in the mold, if required, to thus determine the outer dimensions and/or the frontal outer mold design and to produce both foam-backed molded components having the first outer dimensions and the first frontal outer mold design and foam-backed molded components having the second outer dimensions and the second frontal outer mold design using the same mold. The saved costs and materials, which are realized by the modifiable mold, are advantageous. Additionally, it is conceivable for an existing mold to produce further molds, meaning the profile surface, the outer dimensions and/or the frontal outer mold design can be additionally adapted in any required manner. Equally, the repair of damage is less expensive, since merely the damaged modules need to be replaced, while the remaining module(s) can continue to be used. Preferably, it is conceivable for the first module to be made of a generic material and the second module to be made of a plastic. In order to utilize the advantages of the reduced thermal conductivity of the plastics along with the advantages of the generic materials, the first module, which lends stability to the mold, is made of a generic material having the properties mentioned elsewhere, while the second module is made of a plastic. In the scope of the invention, it has been acknowledged that the first module is exposed to outer and inner force effects and/or environmental influences to a greater extent than the second module. Simultaneously, the entire surface of the second module is in direct contact with the foam-backed molded component, meaning the advantages of a plastic mentioned elsewhere come to full effect. Other divisions according to use are also conceivable. In addition, it is also conceivable for a module to be made in multiple parts and for the parts of the multi-part module to be made of different materials.

In yet another embodiment of the invention, it is conceivable for the mold to have at least one lid. In the scope of the invention, it has been acknowledged that it can also be desired for a foam-backed molded component to have the same profiled surface, the same outer dimensions and/or the same frontal outer mold design as a different foam-backed molded component: its rearward geometric design, however, being different to the geometric design of the other molded part. In this case, it is desirable that the lid, which closes the mold and thus determines the rearward geometric design, is modifiable. This is attained when the mold comprises a first lid having a first design and a second lid having a second design differing from the first design of the first lid. Further, it is conceivable for a mold to have three, four, five, six, seven, eight, nine, ten or more differently designed lids. It is also conceivable for a mold to comprise one, two, three, four, five, six, seven, eight, nine, ten or more first modules; one, two, three, four, five, six, seven, eight, nine, ten or more second modules; and/or one, two, three, four, five, six, seven, eight, nine, ten or more lids in order to generate foam-backed molded components in any combination of design and profiled surface therewith. Moreover, it is conceivable to produce modules and lids in a standardized manner, meaning the modules and the lids of a first mold can be used in a second mold.

In yet another embodiment, it is conceivable for the mold to be produced by means of an additive manufacturing process and/or a chipping method. Additive manufacturing processes and chipping methods offer the option of quickly and easily producing complicated molds. Preferably, the additive manufacturing process is a 3D printing method, during which a machine applies layer after layer of one more liquid or solid materials in a computerized manner. The person skilled in the art knows that such a production method possibly requires finishing steps, such as grinding the produced mold. An advantage of this method is the quick, precise, automatic and simple production of complicated molds of any design.

In yet another embodiment of the method, the cover material is real leather, bonded leather, imitation leather, a textile, a film, a composite material and/or a mixture thereof. It has been deemed as essential to the invention that the cover material is flexible, thin and temperature-resistant to the temperatures arising in the method. For this purpose, the material can also be treated in order for it to subsequently exhibit one, more or all properties desired and/or required for the method and/or required for the intended use. The treatment refers in particular, however in no manner exclusively, to impregnation, coating, in particular coating with a film, hot-pressing, shrinking, padding, calendaring, napping and/or fulling.

The term "textile" refers to a web of suitable fibers, in particular fibers made of cotton, flax, wool, silk, viscose, lyocell, polyacrylonitrile, polypropylene, polyester, polyamide and/or polyurethane. A textile can comprise fibers from one or from several different materials.

It is presumed that the definitions and details of the terms mentioned above apply to all aspects described in the description hereinafter, provided no other remarks are made.

According to the invention, a molded component is proposed which comprises a cover material and a foam-backing, the cover material having an inner side and outer side and the cover material being formed on the outer side to a profiled surface having a profile and the foam-backing being disposed at the inner side. The molded component is characterized in that the foam-backing has an essentially uniform density. In the scope of the invention, it has been acknowledged that the disforming of unsewn molded components having a foam-backing is a result of in particular the occurrence of areas having higher and lower density.

The term "essentially uniform density" refers to the uniform size and prevalence of the foam bubbles in the foam-backing, a slight, in particular insignificant, modification, change and/or deviation being the result during production when it comes to the size and the prevalence owing to statistical scattering.

By means of the molded component according to the invention, it is possible for a durable and resilient foam-backed molded component, which can be designed and adapted individually depending on requirements, to comprise a durable and permanent profiled surface. The molded components continue being uniformly supple and resistant to permanent deformation owing to temporary or continuous pressure.

In another embodiment, it is conceivable for the molded component to be inherently stable. In the scope of the invention, it has been acknowledged that the durability of foam-backed molded components depends on their ability to resume their original shape after temporary or permanent pressure exertion.

In yet another embodiment, it is conceivable for the cover material to be wipeable, water-resistant, water-tight, abrasion-resistant, tear-proof, heat-resistant, cold-resistant, UV-resistant, flame-retardant, air-permeable, sound-absorbing and/or sound-deadening. In the scope of the invention, it has been acknowledged that it is advantageous when the cover material is wipeable, as it is easily cleanable after having become dirty and thus retains its appealing appearance.

Water-resistant materials additionally prevent staining. In the scope of the invention, it has been acknowledged that water entering the foam body can lead to damage or limitations in the intended use of the foam body. This occurs in particular when the foam body subsequently cannot be dried or can only be dried at significant work expenditure, as the permanent moisture can lead to mold formation. For this reason, it is advantageous when the cover material is water-tight and the ingress of moisture is prevented. If the cover material is abrasion-resistant and/or tear-proof, long usage is made possible. The usage of foam-backed molded components in automobiles means they are exposed to temperature fluctuations. Solar radiation means exposure of the foam-backed molded components to direct UV light. Moreover, temperatures well above the ambient temperatures can arise in the automobile. For this reason, the cover material is preferably heat-resistant, cold-resistant and/or UV-resistant. In particular, though by no means exclusively, in automobiles and living spaces and/or work spaces, great risk of injury exists for people present in these spaces when fires break out. For this reason, the prevention and containment of fires is an important concern. This can be attained by flame-retardant materials. Using air-permeable materials facilitates drying the foam body in the event of exposure to moisture. Moreover, it is possible for air displaced via pressure to escape the foam body and be reabsorbed when the pressure decreases. In this manner, the suppleness of the foam-backed molded component can be increased if required. It has been further acknowledged that the molded component is sound-absorbing and/or sound-deadening. A sound absorption decreases or prevents sound reflection on a surface. A sound-deadening property can be attained by choosing a suitable profile and/or material for the cover material and/or foam material. A sound-absorbing property is attained in particular by choosing suitable foam materials. The geometric expansions of the foam-backed molded component, however, are also decisive regarding the degree of sound absorption. The person skilled in the art is familiar with suitable materials and/or geometries which lend a sound-absorbing and/or sound-deadening property to the molded component.

It is further conceivable for the cover material to be real leather, bonded leather, imitation leather, a textile, a film, a composite material and/or a mixture thereof, as described in detail above.

In yet another embodiment, it is conceivable for the profiled surface to have at least one step having a step height of at least 5 mm. In the scope of the invention, it has been acknowledged that a step having a step height of at least 5 mm significantly increases the visibility of profiled surfaces imprinted in the molded component. Using methods according to the state of the art, imprinting steps in the profiled surfaces of at least 5 mm is not possible. Only the combination of the essentially uniform density of the foam-backing with the deformation of the cover material via the vacuum and/or the negative pressure makes it possible to precisely, permanently and stably produce steps of this kind having at least 5 mm. Preferably, the step height is at least 6 mm, at least 6.5 mm, at least 7 mm, at least 7.5 mm, at least 8 mm, at least 8.5 mm, at least 9 mm, at least 9.5 mm or at least 10 mm.

In another embodiment, it is conceivable for the foam material to preferably be a polyurethane foam. A person skilled in the person is familiar with polyurethane and its synthesis, interlacing and/or foam formation.

According to the invention, a molded component for use as a covering is proposed. In particular, it is preferred when the molded component is a covering for a vehicle, a wall, an interior space and/or a transport facility, such as a box. Generally, the manner in which the foam-backed molded component is used is arbitrary: the properties of the foam-backed molded component, however, are of particular importance when the foam-backed molded component is used as a covering. Coverings of vehicles, walls and/or interior spaces are frequently subjected to temporary or permanent pressure exertions caused by persons and/or objects.

In the motor industry, foam-backed molded components are common in the interior space, as they have pleasant haptics owing to their combination of smooth cover materials and the soft foam-backing. Furthermore, the sound-absorbing and/or the sound-deadening properties of foam-backed molded components are appreciated because of the motor sounds. Moreover, they offer a certain degree of protection for objects and/or persons, which are moved in the vehicle interior because of the vehicle dynamics. This protection, however, is a source for temporary or permanent pressure exertion, as the objects and/or persons to be protected bump against the interior covering or lean themselves or are leaned continuously against the same.

When using foam-backed molded components on a wall and/or in an interior space, sound-absorbing and/or sound-deadening properties are also in the forefront in order to create a quiet atmosphere. The option of freely designing the surface speaks in favor of using foam-backed molded components from an artistic viewpoint.

During transport, transport facilities, such as boxes, are often subjected to outer influences, such as bumps. These occur via the movement caused by the transport. The damage of goods to be transported because of this influence is a known problem. By adapting one or more foam-backed molded components in the transport facility, it becomes possible to dampen the influence on the goods to be transported. It is also conceivable for the foam-backed molded component to be adapted to the goods to be transported in order to prohibit movements of the goods to be transported relative to the transport facility.

According to the invention, a molded component is additionally proposed for use as a seat or part of a seat. In the scope of the invention, it has been acknowledged that in particular seats, in particular when used as intended, are subjected to temporary or permanent pressure. In this context, it is desirable for the seats to be uniformly supple when a user takes a seat. A molded component, which has a uniform density, yields uniformly, as described above. This prevents uncomfortable local pressure marks.

According to the invention, a molded component is additionally proposed for use as a clothing piece, an accessory, a suitcase and/or a bag or for use as part of a clothing piece, an accessory, a suitcase and/or a bag. The term "accessory" refers to a fashionable accessory for clothing, such as a jewelry piece, such as a ribbon and/or bracelet, or a part thereof, a fashionable accessory for living, such as a mat, a blanket, a coaster, a cushion, a curtain and/or a cover or a part thereof, and or a fashionable accessory for a vehicle, such as a mat, a blanket, a cushion, a screen and/or a cover or a part thereof.

In the scope of the invention, it has been acknowledged that when the foam-backing is limited in its extent so that the foam-backed molded component is accordingly flat, it is also bendable. For this reason, any kind of use is conceivable, for example the use which is suitable for a textile. Owing to the possibility of arbitrarily shaping the profile, the material for use in fashion, e.g., for clothing pieces, accessories, suitcases and/or bags, is particularly interesting. The clothing piece, the accessory, the suitcase and/or the bag can consist of one or more foam-backed molded components, which are connected, or comprise one or more foam-backed molded components and other materials, in particular textiles and/or metal.

BRIEF DESCRIPTION OF THE DRAWINGS

Further details, features and advantages of the invention are derived from the following description of the preferred exemplary embodiments in connection with the dependent claims. In this context, the corresponding features can be realized each on their own or several in combination with each other. The invention is not limited to the exemplary embodiments. The exemplary embodiments are shown schematically in the figures. The same reference numerals in the individual figures refer to the same elements or elements having the same function and/or corresponding to each other regarding their function.

FIG. 3 shows a lateral cut view through a first and a second module of a mold:

FIG. 4 shows another lateral cut view through a first and second module of a mold:

FIG. 5 shows a detail of a cut through a first and a second module of a mold.

DETAILED DESCRIPTION

Figures 1, 2:
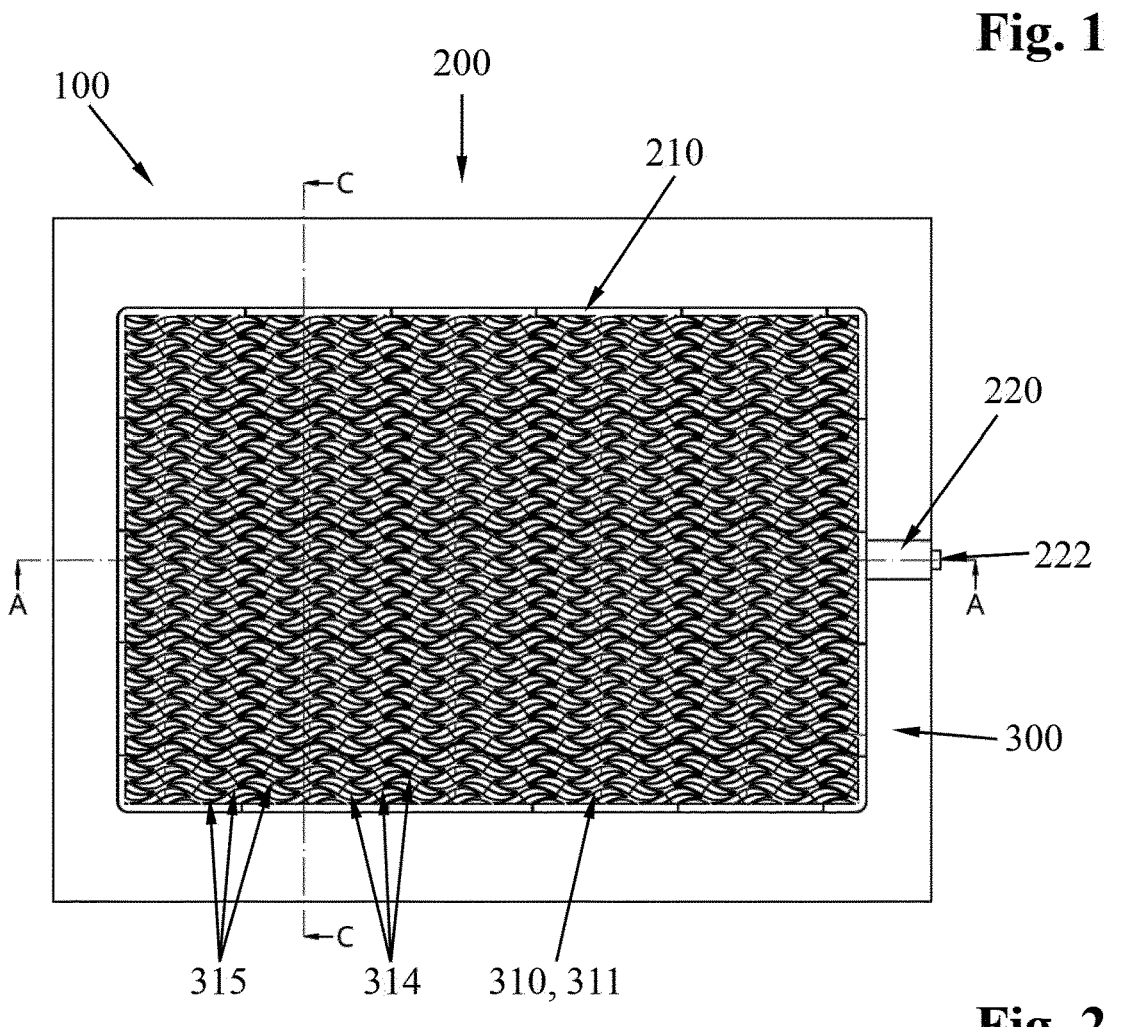
FIG. 1 shows a perspective view of a first module of a mold.
FIG. 2 shows a top view of a first and a second module of a mold.

FIG. 1 shows a perspective view of a first module 200 of a mold 100. First module 200 comprises a recess 210. Recess 210 is meant to receive a second module (not shown). Moreover, first module 200 comprises a negative-pressure channel 220. Negative-pressure channel 220 extends from the side of first module 200 to the center of recess 210. At its first end, in the center of recess 210, negative-pressure channel 220 comprises an outlet 221. At its other end, on the side of first module 200, negative-pressure channel 220 comprises a connection 222. Connection 222 allows a connection to a device (not shown), which is suitable for producing and maintaining a negative pressure and/or a vacuum. Via negative-pressure channel 220, the air is suctioned from recess 210 through negative-pressure channel 220 with the aid of the negative pressure and/or the vacuum. In this manner, a negative pressure and/or a vacuum is also generated in recess 210, provided it is sealed in an airtight manner. An airtight seal of this kind is realized by inserting a cover material (not shown), for example. Besides, first module 200 comprises two outlets 230, which facilitate handling the module. In this exemplary embodiment, first module 200 is made of steel.

FIG. 2 shows a top view of first module 200 and a second module 300 of mold 100. In recess 210 of first module 200, second module 300 is inserted. Laterally to first module 200, connection 222 of negative-pressure channel 220 is identifiable. Second module 300 comprises a negative-profiled surface 310, which is formed by a negative profile 311. Negative profile 311 corresponds to the profile which is to be formed at the profiled surface of the foam-backed molded component, the protrusions and indentations having been inverted. In this embodiment, negative profile 311 is a repeating wave pattern. For forming negative profile 311, negative-profiled surface 310 has edges 314 and surfaces

315. For reasons of clarity, only three edges 314 and three surfaces 315 are exemplarily shown in FIG. 2. In this context, edges 314 are formed by the collision of surfaces 315. Some of surfaces 315 are curved, other surfaces 315 are flat. In this exemplary embodiment, all edges 314 are curved. However, it is also conceivable for a different negative-profiled surface (not shown), which has straight edges, to be produced for forming a different negative profile (not shown), which has straight edges. In this exemplary embodiment, second module 300 is made of a plastic.

FIG. 3 shows a lateral cut through first module 200 and second module 300 of mold 100. The cut for the cut view extends along axis A-A in FIG. 2. Continuous negative-pressure 220 is easily recognizable. Outlet 222 ends below second module 300. Further, connection 222 is easily visible. Negative-profiled surface 310 of second module 300 has edges 314 and surfaces 315. Moreover, negative-profiled surface 310 has protrusions 312 and indentations 313. For reasons of clarity, two edges 314, two surfaces 315, two protrusions 312 and two indentations 313 are shown exemplarily in FIG. 3. First shown surface 315a is curved.

FIG. 4 shows another lateral cut view of first module 200 and second module 300 of mold 100. The cut for the cut view extends along axis C-C in FIG. 2. The second module has negative-profiled surface 310. Likewise, one of surfaces 315 is shown exemplarily. Exemplarily shown surface 315 is flat.

FIG. 5 shows the detail of the cut view in FIG. 4 designated in FIG. 4 with a B. Detail B has been enlarged in FIG. 5. First module 200 and second module 300 of mold 100 are recognizable. Owing to the enlargement, openings 320, which are disposed in indentations 313 of negative-profiled surface 310, are easily identifiable. Openings 320 are continuous so as to connect the upper side of module 300 with the lower side of module 300. In FIG. 5, openings 320 seem closed, which, however, can be led back to the nature of the engineering drawing. The lines at both ends of openings 320 represent the edges of openings 320. Openings 320 can be punctiform or oblong. In addition, second module 300 comprises feet 330. Owing to feet 330, second module 300 is spaced from first module 100, whereby a cavity 340 is created between second module 300 and first module 200. In this embodiment of the invention, feet 330 are round: however, any other functional embodiment is conceivable. In addition, only one cavity 340 is formed in this embodiment: individual cavity sections 340 are connected at other locations (not shown). For reasons of clarity, only two indentations 313, two openings 320 and two feet 330 as well as cavity 340 at two locations are shown exemplarily. As previously described above, a negative pressure and/or vacuum can be generated below second module 300 in recess 210. Via cavity 340, it becomes possible for the negative pressure and/or the vacuum to abut below second module 300 in the entire area. Via continuous openings 320, the negative pressure and/or the vacuum are transferred to the upper side of second module 300. If a cover material (not shown) is now laid over first module 200 and second module 300 and a negative pressure and/or vacuum is generated, the cover material (not shown) experiences a force directed toward second module 300, the force pulling the cover material into negative-profiled surface 310. Via the acting force, the cover material (not shown) is pre-deformed. The cover material (not shown) seals the space in recess 210 with respect to the environment in the process, meaning the negative pressure and/or the vacuum can be maintained.

The invention claimed is:

1. A method for producing a foam-backed molded component, the method comprising the following steps:

a) introducing a cover material in a mold, the mold having a negative-profiled surface, wherein the cover material is a real leather, a bonded leather, an imitation leather, a textile, a film, a composite material, or a mixture thereof;

b) generating and maintaining a vacuum or negative pressure on the side of the cover material facing the mold;

c) pouring a foam material in the mold, the foam material comprising a polyurethane foam;

d) closing the mold;

e) molding the foam material such that a size and prevalence of foam bubbles are essentially uniform over the foam material in all areas;

f) opening the mold and removing the foam-backed molded component, the foam-backed molded component having a profiled surface corresponding to an inverted version of the negative-profiled surface of the mold; and wherein the cover material has the profiled surface comprising a plurality of indentations and protrusions with a height difference formed by at least one indentation and at least one protrusion, wherein the height difference is designed as a continuous and contiguous surface, and wherein the profiled surface further has at least one step with a step height of at least 5 mm.

2. The method according to claim 1, wherein the mold is made partially or entirely of a heat-resistant plastic, a metal, an alloy or a mixture thereof.

3. The method according to claim 1, wherein the mold comprises at least one first module and at least one second module and wherein the at least one first module is made partially or entirely of a first material and the at least one second module is made partially or entirely of a second material, the first and the second material being the same or different.

4. The method according to claim 1, wherein the mold has at least one lid.

5. The method according to claim 1, wherein the mold is produced partially or entirely by means of an additive manufacturing method or a chipping method.

6. A molded component comprising a cover material and a foam-backing, the cover material having an inner side and an outer side, wherein the outer side of the cover material has a profiled surface and the foam-backing being disposed on the inner side of the cover material;

wherein the profiled surface comprises a plurality of indentations and protrusions with a height difference formed by at least one indentation and at least one protrusion, wherein the height difference is designed as a continuous and contiguous surface, the profiled surface further having at least one step with a step height of at least 5 mm;

wherein the cover material is a real leather, a bonded leather, an imitation leather, a textile, a film, a composite material, or a mixture thereof;

wherein the foam-backing is a polyurethane foam such that a size and prevalence of foam bubbles are essentially uniform over the foam-backing in all areas.

7. The molded component according to claim 6, wherein the molded component is inherently stable.

8. The molded component according to claim 6, wherein the cover material is wipeable, water-resistant, watertight, abrasion-resistant, tear-proof, heat-resistant, cold-resistant, UV-resistant, flame-retardant, air-permeable, sound-absorbing or sound-deadening.

9. The molded component according to claim 6 for use as a covering.

10. The molded component according to claim 6 for use as a seat or for use as part of a seat.

11. The molded component according to claim 6 for use as a clothing piece, an accessory, a suitcase or a bag or for use as part of a clothing piece, an accessory, a suitcase or a bag.

* * * * *